(No Model.) 2 Sheets—Sheet 1.
L. SCHIFF.
SLIDE DEVICE FOR MEASURING QUANTITIES OF SOLID MATERIAL.
No. 575,174. Patented Jan. 12, 1897.
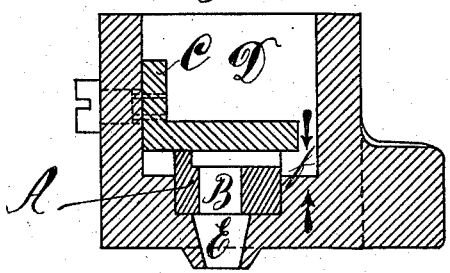
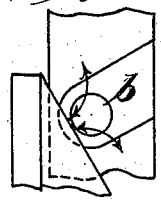
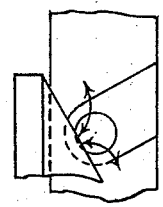
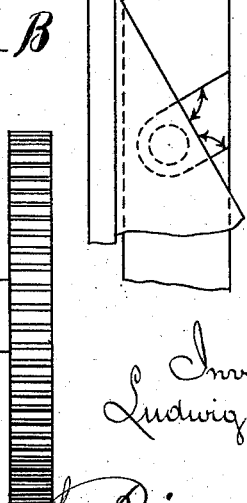
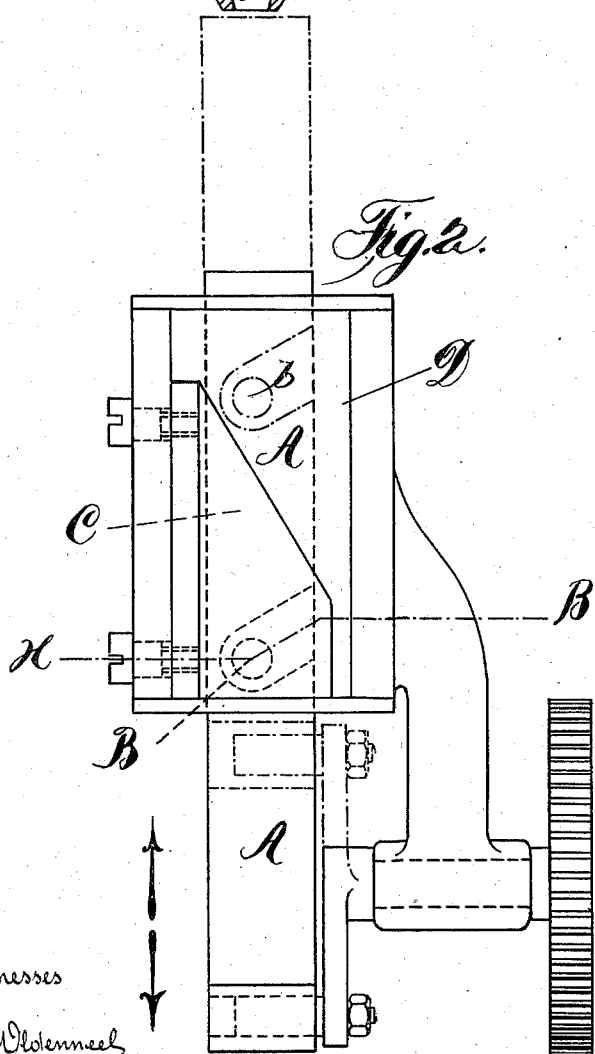
Witnesses
H. van Olderneel
E. A. Scott
Inventor
Ludwig Schiff.
by Richard R
Attorneys (No Model.) 2 Sheets—Sheet 2.
L. SCHIFF.
SLIDE DEVICE FOR MEASURING QUANTITIES OF SOLID MATERIAL.
No. 575,174. Patented Jan. 12, 1897.
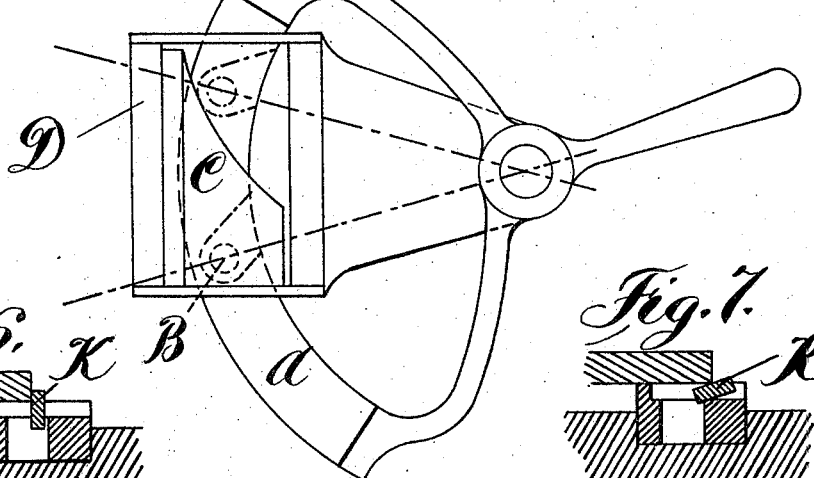
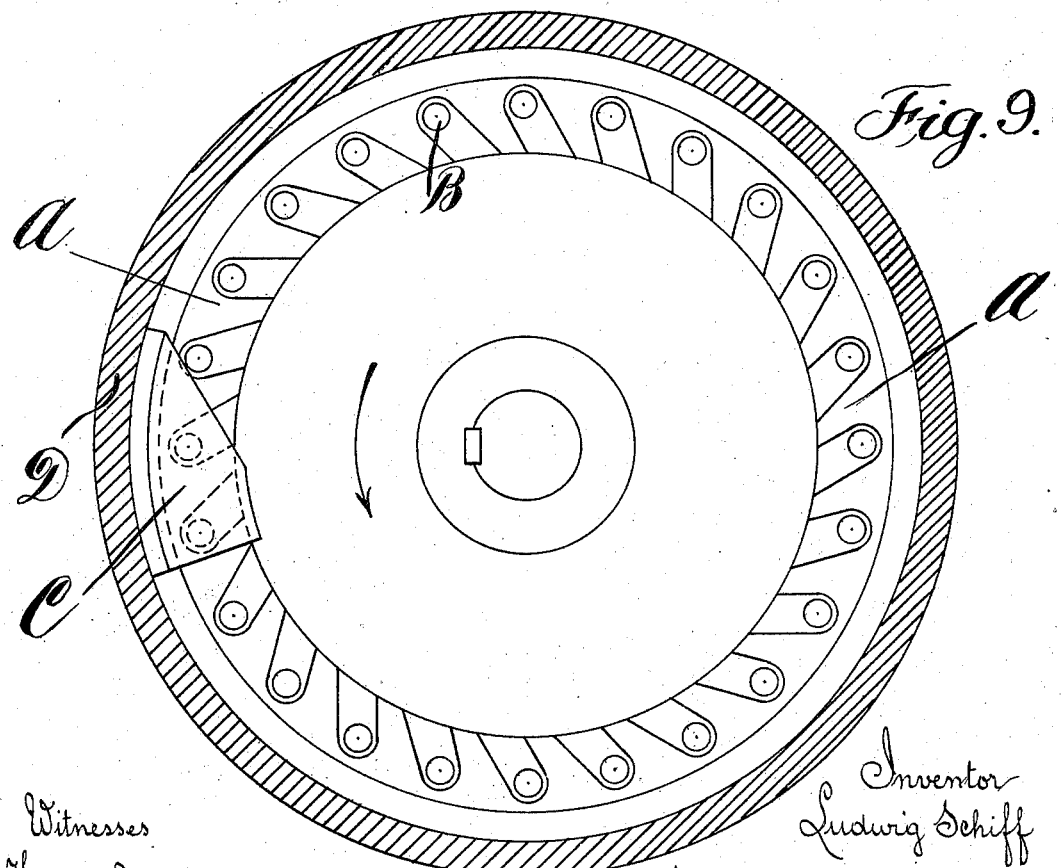
Witnesses
H. van Oldenneel
E. A. Scott
Inventor
Ludwig Schiff
by Richards
Attorney

UNITED STATES PATENT OFFICE.

LUDWIG SCHIFF, OF CARLSRUHE, GERMANY, ASSIGNOR TO THE DEUTSCHE METALLPATRONENFABRIK, OF SAME PLACE.

SLIDE DEVICE FOR MEASURING QUANTITIES OF SOLID MATERIAL.

SPECIFICATION forming part of Letters Patent No. 575,174, dated January 12, 1897.

Application filed September 8, 1896. Serial No. 605,066. (No model.)

*To all whom it may concern:*

Be it known that I, LUDWIG SCHIFF, a subject of the German Emperor, and a resident of Carlsruhe, Grand Duchy of Baden, Germany, have invented certain new and useful Improvements in a Slide Device for Measuring Solid Materials, of which the following is a specification.

This invention relates to an improved slide device for measuring quantities of solid materials in pulverulent, granular, and similar divided forms. In the following description the material will be referred to as "grain," which term is intended to designate, quite generally, one of the separate particles, whether of granular, laminated, or disk form, of which the material is formed.

Slide measuring devices as heretofore constructed contain one or more measuring-cavities, into which the material to be measured is filled, and which are open on the surface of the slide. This surface can be flat, cylindrical, conical, or spherical.

Over the measuring-cavity passes a scraping device, the lower surface of which (the actual scraping-surface) is identical in form with the slide-surface. The front edge of this scraping-surface is the scraping edge. In the following the periphery of the measuring-cavity on the surface of the slide will be called the "filling edge." In scraping off the material contained in a measuring-cavity the quanty thereof which projects above the surface of the slide is pushed away by the scraping edge. At those points where the scraping edge and filling edge cross each other it may happen that a grain is gripped between the two edges, so that on the farther relative motion of the two parts such grain will be cut in two. This occurs more particularly when the angle at which the edges cross each other is smaller than the friction-angle which the material to be measured possesses relatively to the substance of which the slide and scraper are formed. The crossing-angle is to be considered the angle which those parts of the edges form with each other at the point of crossing that belong to the still-uncovered part of the cavity-opening. It is just before the complete closure of the cavity-opening by the scraping edge that the above-mentioned case of gripping and cutting off of the particle of the material mostly takes place. If now the slide has to effect the measuring operations several thousand times, (as is generally the case with the known measuring slide devices of automatically-operating measuring-machines,) the scraping edge and the filling edge (even when of hardened steel) become worn and blunt in the course of time. The consequence thereof is that the cutting off of the particles between the blunt edges becomes more and more difficult, and that pulverized material is drawn in between the slide-face and scraper-face by the funnel or wedge-like action of the blunted edges.

A further disadvantage consists in that with many materials a relatively considerable expenditure of force is required for cutting through the gripped grains, and, thirdly, it may, under some circumstances, be of importance in measuring off quantities to have only entire grains in these, so that the cutting of the grains also constitutes a disadvantage.

All these disadvantages are obviated by the use of the improved slide device that forms the subject of the present invention, and which is as follows:

Referring to the accompanying drawings, Figures 1 and 2 show, respectively, a vertical section and a plan of a flat measuring-slide having a rectilinear to-and-fro motion. Figs. 3, 4, and 5 are diagrammatic views showing the action of the slide. Figs. 6 and 7 are sectional views through the feed-slide and scraper. Fig. 8 illustrates a hand-operating connection for the slide, and Fig. 9 shows how the slide may be embodied in a rotary machine.

The slide A has a cavity B extending through it, which constitutes the filling-measure.

C is the fixed scraper, D the vessel from which the slide receives its charge, and E the opening through which the contents of the measuring capacity are discharged.

The slide receives its to-and-fro motion either by hand or otherwise, such as by a crank motion, as indicated. The motion of the slide is indicated by a double arrow I II.

In the upper surface of the slide is cut a groove $b$, the edges of which are placed obliquely to the direction of motion. The width of the groove is greater than the opening of the measuring-cavity. Consequently the latter does not open into the surface of the slide, but into that of the groove. The scraping edge of the scraper C is placed at right angles to the edges of the groove $b$. If now the measuring-cavity B has become filled with material when in the position indicated by dot-and-dash lines, Fig. 2, and the slide moves back under the scraper in the direction of the arrow II, then the groove will occupy relatively to the scraping edge successively the positions shown at Figs. 3, 4, and 5. The crossing-angle which is then formed by the scraping edge with the edges of the groove is, according to the above definition, first an obtuse angle, Figs. 3 and 4, and then a right angle, Fig. 5. Any cutting off of the material between the scraping edge and the edges of the groove can therefore not take place, and any grain that projects partly above the surface of the slide at the point of crossing of the scraping edge and edge of the groove will be pushed along the latter and will finally be pushed out of the groove as the slide projects to the height $f$, Fig. 1, that is, rather more than the height of the groove above the bottom of the charging-receptacle.

The scraping edge does not come at all directly in contact with the upper edge of the measuring-cavity, as the surfaces in which the two edges lie are separated from each other by the depth of the groove.

The depth of the groove is made proportionate to the size of the grains of the material in such manner that when the upper edge of the measuring-cavity passes under the edge of the scraping edge, Fig. 6, a grain K cannot be nipped between the two edges, but will at most be pushed down into the groove, as at Fig. 7.

During the discharging of the material from the cavity B the discharge-opening E will communicate with the receptacle D through the cavity B; but any direct flow of the material from the former into the latter cannot take place owing to the length of the groove and its small relative height.

By means of the described construction the wear of the slide and the scraper is lessened, the cutting of the separate grains is effectually prevented, and consequently the power required to move the slide is considerably reduced. Lastly, the measured quantity only contains entire grains. The angle which the edges of the groove form with the direction of motion of the slide can vary between wide limits.

The angle which the scraping edge forms with the edge of the groove need not be an accurate right angle, but only approximately so.

The edges of the groove need not be rectilinear, but may be curved, provided that the scraping edge be so formed as to form approximately a right angle therewith at every point of its motion.

The slide need not have a rectilinear form and motion, as shown at Figs. 1 and 2. It may also be of a flat curved form, having a reciprocating motion on a center, as at Fig. 8, or it may be of flat circular form with reciprocating or continuous rotary motion, as at Fig. 9, or it may be of cylindrical or spherical form with continuous or reciprocating rotary motion.

The arrangement at Fig. 9 enables a large number of measuring-cavities to be combined in one slide, whereby the slide is enabled to deliver equal measured quantities of granular material at very short intervals while fulfilling the above-described conditions. These advantages are of particular importance when it is a question of delivering by means of the slide at very short intervals very small quantities of uncut material, such as from two to three grains.

I claim—

1. A movable-slide device for measuring quantities of pulverulent, granular or similar divided materials wherein the surface of the slide above the measuring-cavity is formed with a groove extending at an angle to the direction of motion of the slide, while the front edge of the scraper is so arranged as to be at right angles, or nearly so, to the edges of the said groove at the crossing-points thereof, whereby a jamming or cutting of a grain of the material between the upper edge of the said measuring-cavity and the edge of the scraper is prevented substantially as described.

2. In combination, the slide having an opening and a groove in its upper side extending to the edge obliquely to the line of movement, the scraper having an edge inclining to the line of movement of the slide, and a casing carrying said parts, the walls of said groove being arranged to form first an obtuse angle with the inclined edge of the scraper and then a right angle, substantially as described.

In testimony whereof I have hereunto set my hand, at Mannheim, Germany, this 21st day of August, 1896, in the presence of two subscribing witnesses.

LUDWIG SCHIFF.

Witnesses:
   JULIUS LANDAUER,
   AUGUST EHRHARDT.